United States Patent
Dutta

(10) Patent No.: US 9,313,134 B2
(45) Date of Patent: Apr. 12, 2016

(54) LEVERAGING HARDWARE ACCELERATORS FOR SCALABLE DISTRIBUTED STREAM PROCESSING IN A NETWORK ENVIRONMENT

(71) Applicant: CISCO TECHNOLOGY, INC., San Jose, CA (US)

(72) Inventor: Debojyoti Dutta, Santa Clara, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 240 days.

(21) Appl. No.: 14/054,542

(22) Filed: Oct. 15, 2013

(65) Prior Publication Data
US 2015/0103837 A1    Apr. 16, 2015

(51) Int. Cl.
*H04L 12/28* (2006.01)
*H04L 12/803* (2013.01)

(52) U.S. Cl.
CPC .................................. *H04L 47/125* (2013.01)

(58) Field of Classification Search
None
See application file for complete search history.

(56) References Cited

U.S. PATENT DOCUMENTS

| | | | | |
|---|---|---|---|---|
| 8,018,866 | B1* | 9/2011 | Kasturi et al. ................ | 370/252 |
| 9,009,322 | B1* | 4/2015 | Molleti et al. ................ | 709/226 |
| 2009/0217266 | A1* | 8/2009 | Krishnamurthy et al. .... | 718/100 |
| 2011/0314019 | A1 | 12/2011 | Peris et al. | |

OTHER PUBLICATIONS

Aniello, et al., *Adaptive Online Scheduling for Storm*, Proceedings of the 7th ACM International Conference on Distributed Event-Based Systems DEBS'13, (Jun. 29-Jul. 3, 2013) Arlington, Texas, USA.
Chai, et al., *Extending a Stream Programming Paradigm to Hardware Accelerator Platforms*, Proceedings of 2009 Symposium on Application Accelerators in High Performance Computing (Jul. 28-30, 2009), Urbana, Illinois.

* cited by examiner

*Primary Examiner* — Chi H Pham
*Assistant Examiner* — Fahmida Chowdhury
(74) *Attorney, Agent, or Firm* — Patent Capital Group

(57) ABSTRACT

An example method for leveraging hardware accelerators for scalable distributed stream processing in a network environment is provided and includes allocating a plurality of hardware accelerators to a corresponding plurality of bolts of a distributed stream in a network, facilitating a handshake between the hardware accelerators and the corresponding bolts to allow the hardware accelerators to execute respective processing logic according to the corresponding bolts, and performing elastic allocation of hardware accelerators and load balancing of stream processing in the network. The distributed stream comprises a topology of at least one spout and the plurality of bolts. In specific embodiments, the allocating includes receiving capability information from the bolts and the hardware accelerators, and mapping the hardware accelerators to the bolts based on the capability information. In some embodiments, facilitating the handshake includes executing a shadow process to interface between the hardware accelerator and the distributed stream.

17 Claims, 4 Drawing Sheets

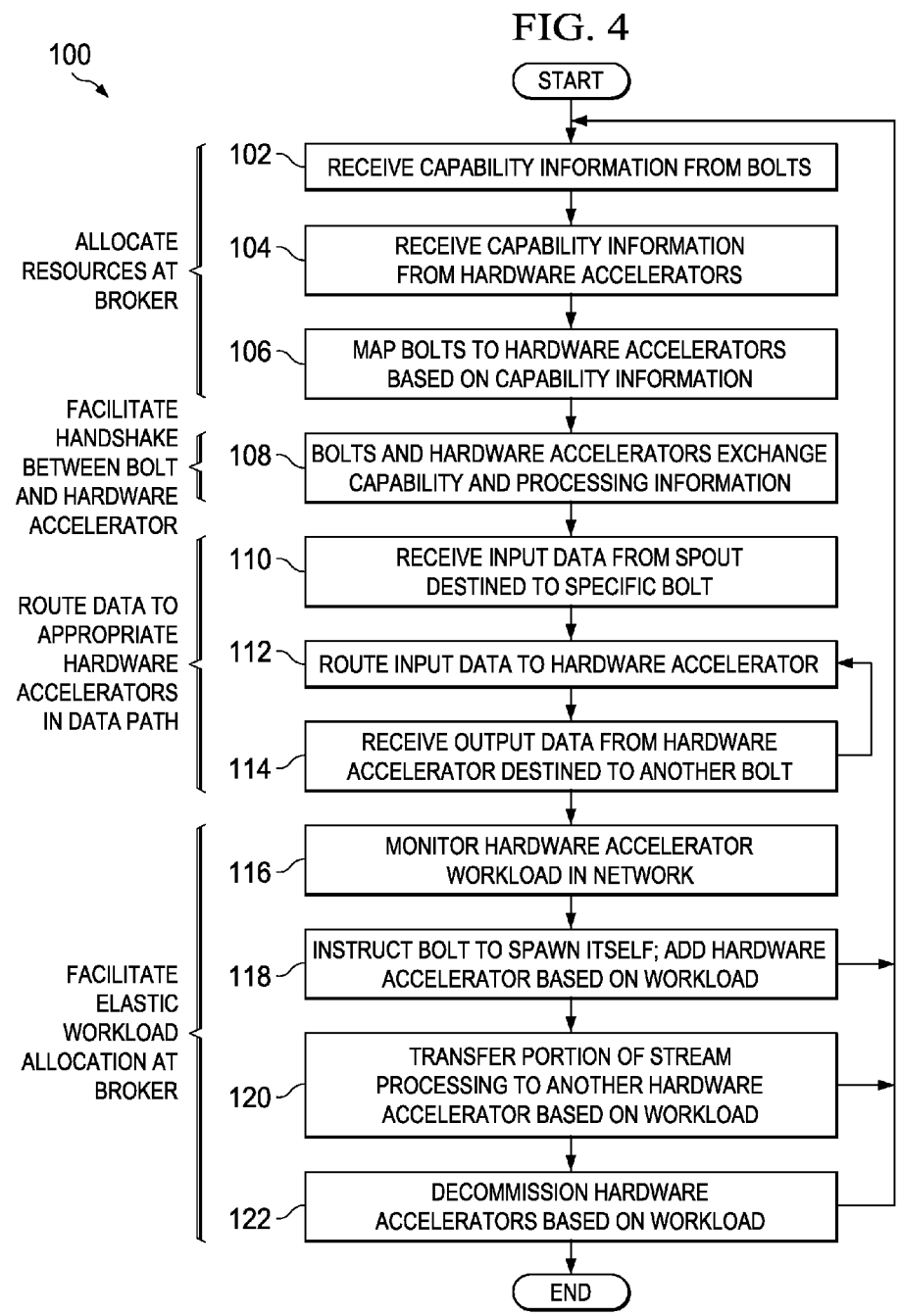

LEVERAGING HARDWARE ACCELERATORS FOR SCALABLE DISTRIBUTED STREAM PROCESSING IN A NETWORK ENVIRONMENT

TECHNICAL FIELD

This disclosure relates in general to the field of communications and, more particularly, to leveraging hardware accelerators for scalable distributed stream processing in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified flow diagram illustrating example operations that may be associated with an embodiment of the communication system.

DETAILED DESCRIPTION OF EXAMPLE EMBODIMENTS

Overview

An example method for leveraging hardware accelerators for scalable distributed streams in a network environment is provided and includes allocating a plurality of hardware accelerators to a corresponding plurality of bolts of a distributed stream in a network, facilitating a handshake between the hardware accelerators and the corresponding bolts to allow the hardware accelerators to execute respective processing logic on data elements of the distributed stream according to the corresponding bolts, and performing elastic allocation of hardware accelerators and load balancing of stream processing in the network. As used herein, the term "stream" encompasses an unbounded sequence of data elements, each of which possesses an intrinsic temporal quality (e.g., quality varying in time), wherein each data element can be distinguished from other data elements according to its respective temporal quality; a "distributed stream" is a stream that is processed by a plurality of computing devices connected across a network. The data elements may be formatted into fields to create tuples (e.g., named list of values, with fields comprising an object of any type). The distributed stream comprises a topology of at least one spout and the plurality of bolts. As used herein, the "spout" generates the data elements in the stream, and the "bolt" implements processing logic to process (e.g., run functions, filter tuples, perform stream aggregations, talk to databases, etc.) the data elements in the stream.

Example Embodiments

Figure 1:
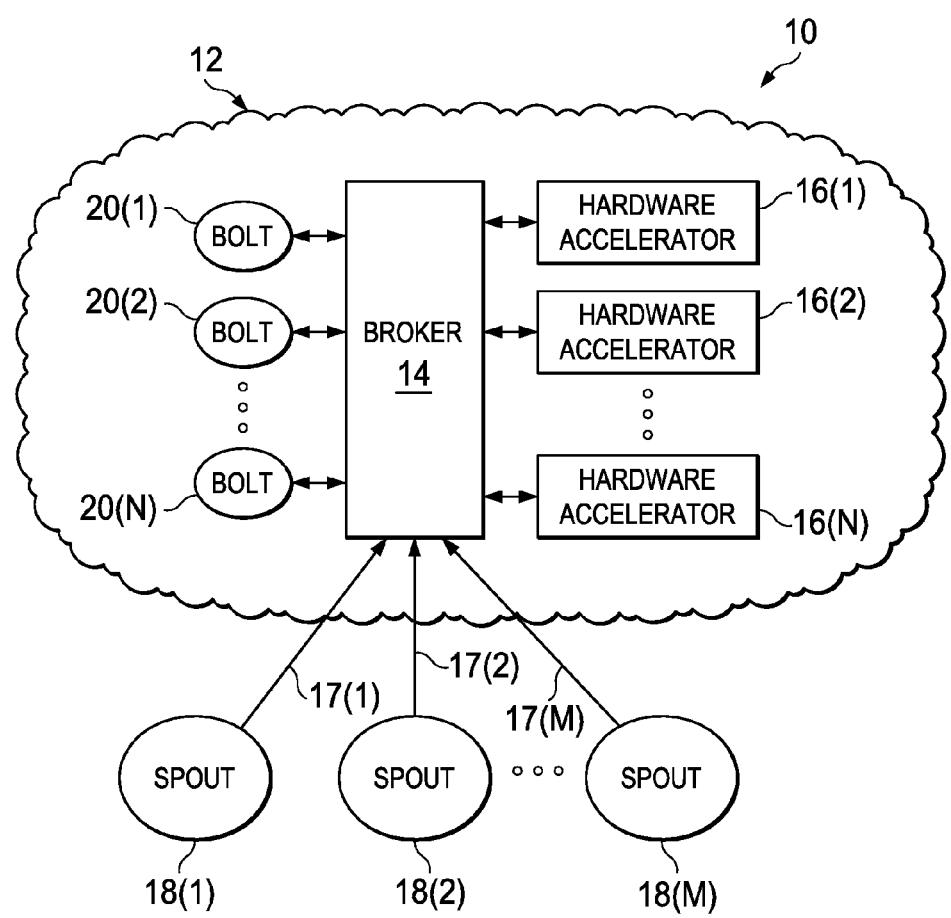
FIG. 1 is a simplified block diagram illustrating a communication system for leveraging hardware accelerators for scalable distributed stream processing in a network environment.

Turning to FIG. 1, FIG. 1 is a simplified block diagram illustrating a communication system 10 for leveraging hardware accelerators for scalable distributed stream processing in a network environment in accordance with one example embodiment. FIG. 1 illustrates a network 12 comprising a broker 14, which facilitates leveraging a plurality of hardware accelerators 16(1)-16(N) for processing one or more distributed streams 17(1)-17(M). Data elements emitted by spouts 18(1)-18(M) may constitute distributed streams 17(1)-17(M); the data elements can be transformed appropriately according to processing at bolts 20(1)-20(N) in network 12. For example, spout 18(1) may emit a stream of tweets; spout 18(2) may read event logs from sensors; spout 18(M) may generate network traffic information; etc. In another example, bolts 20(1)-20(N) may consume any number of streams, process them, and emit new streams, comprising processed data elements of the input streams.

Each spout 18(1)-18(M) and each bolt 20(1)-20(N) may subscribe to one or more distributed streams 17(1)-17(M). When one of spouts 18(1)-18(M) or bolts 20(1)-20(N) emits a tuple to one of streams 17(1)-17(M) (e.g., 17(1)), it sends the tuple to every bolt 20(1)-20(N) that subscribes to that stream (e.g., 17(1)). According to various embodiments, broker 14 can leverage hardware accelerators 16(1)-16(N) to execute the processing logic on data elements of distributed streams 17(1)-17(M) according to bolts 20(1)-20(N).

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Stream processing is a computer programming paradigm that simplifies parallel software and hardware by restricting parallel computations that can be performed; given a set of data (a stream), a series of operations (kernel functions) is applied to each element in the stream. Stream processing advocates a gather, operate, and scatter style of programming. First, the data is gathered into a stream from sequential, striated, or random memory locations. The data is then operated upon by one or more kernels, where each kernel comprises of several operations. Finally, the live data is scattered back to memory.

In stream-based applications, data generated in some external environment, is pushed asynchronously to in-network servers that process the information. Some example applications include market feed processing, electronic trading, social media, sensor networks, location-tracking services, and network management, such as Twitter™ Storm, Google Dremel™ and Yahoo™ S4. The applications are characterized by a need to process high-volume data streams in a timely and responsive fashion. In contrast to architecture of some database management systems with a pull-based model of data access (e.g., the user submits a query for data to a system and an answer is returned), the architecture of stream-based applications includes a push-based model of data access, where data is automatically pushed to a system in response to detected events. Query answers are pushed to an awaiting user or application.

Many stream-based applications are distributed with applications often embedded in an environment with numerous connected computing devices. As data is communicated from its point of origin (e.g., sensors) downstream to applications, it passes through many computing devices, each of which may process the data appropriately according to a specific stream algorithms.

Storm™ is an example of an open source distributed real-time computation system for processing stream-based application. The stream-based application is modeled as a topology, with a graph where nodes are operators and edges represent data flow among the operators. Storm runs topologies (e.g., graphs of computation) comprising one or more spouts and one or more bolts; a scheduler executing on a master node (e.g., computing device) schedules processing of the topologies in different worker nodes (e.g., computing devices). The master node runs the scheduler daemon (called "Nimbus"), which is responsible for distributing code around the topologies, assigning tasks to computing devices and monitoring for failures. Each worker node runs a daemon called the "Supervisor," which listens for work assigned to its computing device and starts and stops worker processes as necessary based on its scheduled assignments from the scheduler. Each worker process executes a subset of a topology (e.g., one or more bolts); a running topology consists of many worker processes spread across many computing devices.

Stream processing can be suitable for several mining and learning applications that execute at high speeds. Many currently existing solutions to stream processing perform computations exclusively in software that runs on general purpose processors in traditional computing devices (e.g., servers, computers, etc.). Because some types of computations may be performed slower than others, the slow processes can slow down the entire stream processing. At least one existing solution uses hardware accelerators for stream processing, where a single stream is processed in its entirety by a single hardware accelerator.

Hardware accelerators are typically used to perform some functions faster than is possible in software running on general purpose processors. The main difference between hardware and software is concurrency, allowing hardware to be much faster than software. Hardware accelerators are designed for computationally intensive software code. The hardware that performs the acceleration, when in a separate unit from the processor, is referred to as a hardware accelerator. Hardware accelerators can be implemented in any suitable form, such as field-programmable gate array chips (FPGAs). Although, the hardware accelerator approach has enabled improving the performance of single nodes, it has not enabled scaling and has not been sufficiently successfully applied in a distributed environment.

Communication system 10 is configured to address these issues (and others) in offering a system and method for leveraging hardware accelerators for scalable distributed stream processing in a network environment. According to embodiments of communication system 10, broker 14 may allocate plurality of hardware accelerators 16(1)-16(N) to corresponding plurality of bolts 20(1)-20(N) of one or more distributed streams 17(1)-17(M) in network 12. Broker 14 may facilitate a handshake between hardware accelerators 16(1)-16(N) and corresponding bolts 20(1)-20(N) to allow hardware accelerators 16(1)-16(N) to execute respective processing logic on data elements of distributed streams 17(1)-17(M) according to corresponding bolts 20(1)-20(N). Broker 14 may perform elastic allocation of hardware accelerators 16(1)-16(N) and load balancing of stream processing in network 12.

In a specific embodiment, broker 14 may receive capability information from bolts 20(1)-20(N) and hardware accelerators 16(1)-16(N) and map hardware accelerators 16(1)-16(N) to corresponding bolts 20(1)-20(N). The capability information from bolts 20(1)-20(N) may include respective locations in distributed streams 17(1)-17(M) and identities; the capability information from hardware accelerators 16(1)-16(N) may include respective network locations (e.g., Internet Protocol (IP) address), and capabilities (e.g., RegEx processor, graphics processor, etc.). The mapping may be formatted into any suitable table, spreadsheet, memory mapping, etc. as suitable and based on particular needs. According to various embodiments, the mapping may be used to route the data elements of distributed streams 17(1)-17(M) to appropriate hardware accelerators 16(1)-16(N) for stream processing.

In various embodiments, broker 14 may facilitate the handshake by executing a shadow process to interface between hardware accelerators 16(1)-16(N) and corresponding bolts 20(1)-20(N). The handshake can include an exchange of the capability information and processing information between hardware accelerators 16(1)-16(N) and corresponding bolts 20(1)-20(N). The processing information can include logic to extract input data from distributed streams 17(1)-17(M) for processing, format input data, and format output data to distributed streams 17(1)-17(M) after processing and destination of the output data in the network. The destination can include identity of the next bolt or location of the corresponding hardware accelerator.

In some embodiments, broker 14 may perform elastic allocation of hardware accelerators 16(1)-16(N) and load balancing of stream processing by monitoring hardware accelerator workload in network 12. If the workload is high, broker 14 may instruct at least one of bolts 20(1)-20(N) to spawn (e.g., copy, replicate, duplicate) itself, and add a new hardware accelerator. Broker 14 may subsequently receive appropriate capability information from the spawned bolt and the new hardware accelerator, map the spawned bolt to the new hardware accelerator, and facilitate the handshake between the spawned bolt and the new hardware accelerator. If the workload indicates that one of hardware accelerators 16(1)-16(N) is over-loaded, broker 14 may facilitate transferring at least a portion of stream processing to another one of hardware accelerators 16(1)-16(N). If the workload indicates that some of hardware accelerators 16(1)-16(N) are not loaded appropriately, broker 14 may decommission (e.g., remove from mapping, remove from network, etc.) the unloaded hardware accelerators, and update the mapping appropriately.

Note that a topology can be a generic graph and each node on the topology can be replicated due to parallelism. In a general sense, the topology determines the specific tuples to accept (e.g., based on the spouts that generate the tuples) and the routes of the tuples according to programmable rules for each edge of the topology. For example, the programmable rules may indicate that a specific tuple may be hashed based on a particular field and sent to one among k parallel instances of the next hop node. The topology can be mapped to appropriate processing hardware accelerators 16(1)-16(N) while broker 14 (and potentially other suitable middleware components) takes care of the queuing and tuple routing.

Consider a topology A→X→B where X performs a regular expression (RegEx) processing. Assume that a specific line card in network 12 can process packets and search for patterns programmed using a command line interface (CLI) and Extensible Markup Language (XML) configuration (e.g., similar to Cisco NXOS). Additionally, a control plane software executing broker 14 may be modified to publish matches on a particular bus (e.g., pubsub bus) as defined in the CLI. The accelerated data path can be set up according to the following operations: (1) create a proxy node for X; (2) in the proxy node, accept incoming tuples and redirect them to the line card; (3) configure the proxy node to subscribe to the pubsub queue bus; and (4) during setup of the topology, configure the proxy node to open a XML/Netconf+SSH connection and program the rules for the RegEx processing.

The proxy node configuration can differ based on the specific stream tuples (e.g., configuration for video analytics acceleration to detect some objects given a scene may be different from configuration for textual regular expression mapping). In addition, a suitable scheduler may be provided that knows the locations and capabilities of hardware accelerators 16(1)-16(N) and the relative network locations or distances between the various computing devices (including hardware accelerators 16(1)-16(N) and servers executing one or more bolts 20(1)-20(N)).

Consider an example where a PCIe card that has a regex engine comprising hardware accelerator 16(1). Consider a storm topology that processes data for patterns and calculates distribution of the patterns. In software, the following topology may be used: MessageBus→Spout→Regex_Bolt→Count_Bolt→Collector_Bolt→MessageBus. The Regex_Bolt may be more resource intensive than the other bolts, and could slow down the overall stream processing. Broker 14 may define a Regex_Bolt wrapper subclassing from ShellBolt (e.g., a bolt that shells out to another process to process tuples; ShellBolt communicates with that process over standard input/output using a special protocol), which can process data to/from standard input/output and also instruct broker 14 to accelerate stream processing. A bolt class may be extended to generate the Regex_Bolt wrapper.

Broker 14 may execute a shadow process (or a ShellBolt subclass) that can communicate via appropriate thrift interfaces between hardware accelerators 16(1)-16(N) and bolts 20(1)-20(N). The ShellBolt extension may send data to the PCIe based hardware accelerator, get the results and communicate it back to the distributed stream using the thrift interfaces. The regex hardware accelerator can perform the regex processing faster than in software using a general purpose processor. According to various embodiments, hardware acceleration of distributed stream processing can increase the speed of the processing in network 12.

In various embodiments, broker 14 may facilitate a control flow and may set up data flows for distributed streams 17(1)-17(M). Software corresponding to each of bolts 20(1)-20(N) may translate data elements from a first format (e.g., in Storm tuple format) of distributed streams 17(1)-17(M) to a second format compatible with hardware accelerators 16(1)-16(N). It may be noted that all data elements of distributed streams 17(1)-17(M) need not necessarily be controlled by broker 14. In some embodiments, broker 14 may allocate hardware accelerators 16(1)-16(N) for some, not all, bolts 20(1)-20(N) that may be called during processing of distributed streams 17(1)-17(M). In other embodiments, broker 14 may allocate hardware accelerators 16(1)-16(N) for substantially all bolts 20(1)-20(N) that may be called during processing of distributed streams 17(1)-17(M). Various such configurations are included within the broad scope of the embodiments. Moreover, because broker 14 is not in the data flows during processing of distributed streams 17(1)-17(M), broker 14 may not be a bottleneck (e.g., slowing down processing time) during the stream processing.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, hardware accelerators 16(1)-16(N) may be located in, or comprise, suitable line cards or PCIe based cards in an appropriate network element. As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In various embodiments, broker 14 may be an application executing in a suitable network element in network 12. Bolts 20(1)-20(N) may comprise processes executing at various computing devices, such as servers, in network 12. Spouts 18(1)-18(M) may comprise network sensors and similar hardware, or an application running on appropriate computing devices (e.g., mobile phones, laptops, servers, desktop computers, machines, etc.) that can communicate with network 12.

Figure 2:
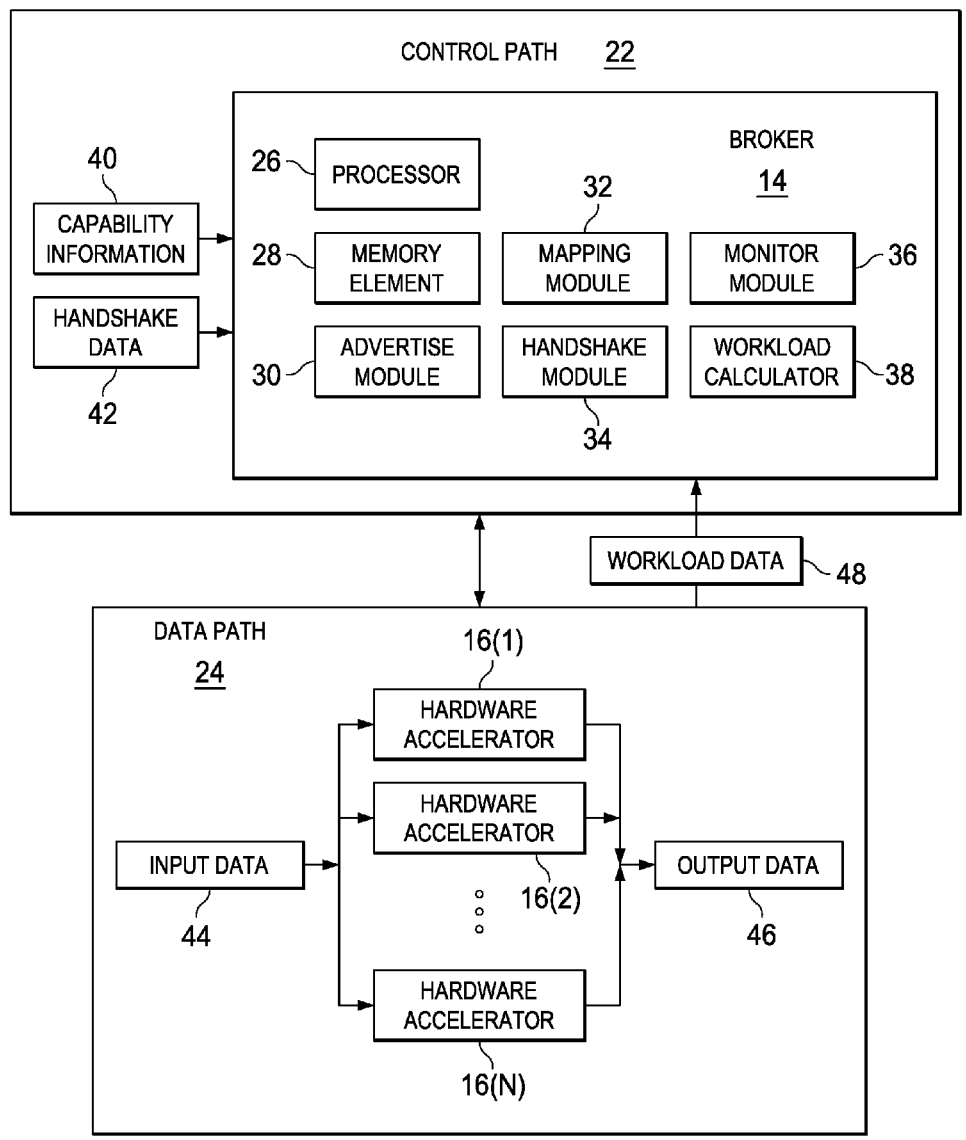
FIG. 2 is a simplified block diagram illustrating example details of an embodiment of the communication system.

Turning to FIG. 2, FIG. 2 is a simplified block diagram illustrating example details of an embodiment of communication system 10. A control path 22 may include control configurations for routing data in network 12; a data path 24 may include the various network elements through which the data traverses network 12. Control path 22 may include broker 14, which can comprise a processor 26, a memory element 28, an advertise module 30, a mapping module 32, a handshake module 34, a monitor module 36 and a workload calculator 38.

During configuration, capability information 40 from bolts 20(1)-20(N) and hardware accelerators 16(1)-16(N) may be received by advertise module 30. Capability information 40 from bolts 20(1)-20(N) can include the relative locations of bolts 20(1)-20(N) in corresponding distributed streams 17(1)-17(M) and their identities (which can include the processing logic implemented by respective bolts). Capability information 40 received from hardware accelerators 16(1)-16(N) can include the respective IP addresses and capabilities (e.g., processing capabilities including type of accelerator). In various embodiments, capability information 40 may be advertised using suitable advertisement protocols, such as Neighbor Discovery Protocol (NDP), interior Border Gateway Protocol (IBGP), etc.

Mapping module 32 may read capability information 40 aggregated by advertise module 30, and suitably map bolts 20(1)-20(N) to corresponding hardware accelerators 16(1)-16(N) based on various factors, including capability matching (e.g., hardware accelerator that can perform RegEx processing mapped to bolt that performs RegEx processing, etc.), and proximity (e.g., relative locations in network 12). The mapping may be stored at a suitable location accessible by switches and other appropriate network elements within network 12, published in network 12, or otherwise broadcasted to appropriate network elements involved in routing the data elements of data streams 17(1)-17(M).

Handshake module 34 may receive handshake data 42 from bolts 20(1)-20(N) and hardware accelerators 16(1)-16(N). Handshake data 42 may comprise capability information 40 and processing information of hardware accelerators 16(1)-16(N) and the corresponding bolts 20(1)-20(N). For example, handshake data 42 may include logic to extract input data from distributed streams 17(1)-17(M) for processing, format input data, and format output data to distributed streams 17(1)-17(M) after processing, and destination of the output data. For example, data from bolt 20(1), whose processing logic is executed by hardware accelerator 16(1), may be sent to hardware accelerator 16(2), which executes processing logic according to bolt 20(2).

During the data processing, input data 44 may be received by hardware accelerators 16(1)-16(N), processed accordingly, and output data 46 may be forwarded to the next processing element, as appropriate, for example, according to handshake data 42 and the mapping between bolts 20(1)-20(N) and hardware accelerators 16(1)-16(N). Broker 14, which may execute in control path 22 may not interfere actively into data path 24. However, in some embodiments, monitor module 36 may monitor the workload (e.g., amount of work, number of processes, amount of resources used during processing, etc.) in hardware accelerators 16(1)-16(N). The monitored data may be pushed to broker 14 as workload data 48. Workload calculator 38 may determine the workload of various hardware accelerators 16(1)-16(N) and perform elastic allocation and load balancing in network 12 appropriately.

Figure 3:
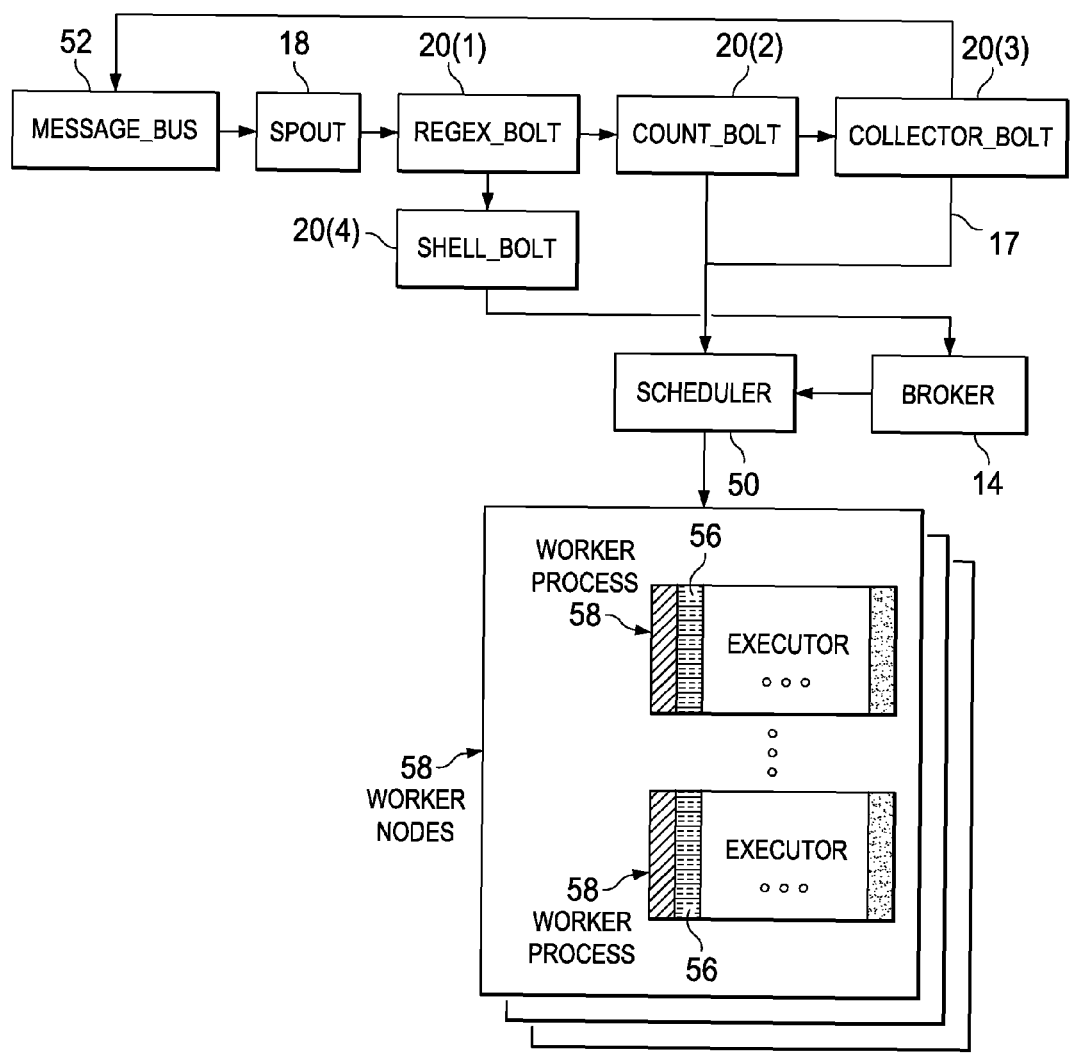
FIG. 3 is a simplified block diagram illustrating yet other example details of an embodiment of the communication system.

Turning to FIG. 3, FIG. 3 is a simplified block diagram illustrating example details of an embodiment of communication system 10. An example distributed stream 17 may be scheduled by a scheduler 50 and may comprise a message bus 52 that carries data elements generated at spout 18 through Regex_Bolt 20(1); Count_Bold 20(2) and Collector_Bolt 20(3). Distributed stream 17 may comprise a topology that processes data for patterns and calculates distribution of the patterns. In software, the following topology may be used: MessageBus 52→Spout 18→Regex_Bolt 20(1)→Count_Bolt 20(2)→Collector_Bolt 20(3)→MessageBus 52.

From an architectural standpoint, distributed stream 17 may be processed by a set of computing devices called worker nodes 54. According to various embodiments, worker nodes 54 may include hardware accelerators 16(1)-16(N) and/or other computing devices. Once deployed (e.g., after suitable configuration in the various computing devices in network 12), the topology can comprise of a set of threads 56 executing inside a set of worker processes 58 that are distributed over worker nodes 54. In various embodiments, worker processes 58 may comprise Java processes. Each worker node 54 may be configured with a maximum number of worker processes 58 that can execute concurrently on that worker node. A thread of a particular distributed stream 17 is called executor; in a general sense, substantially all the executors executed by a worker process 58 belong to the same topology. Each executor may carries out the processing logic of a portion of one of bolts 20(1)-20(3).

Scheduler 50 may comprise a single Java process in charge of accepting a new topology, deploying it over worker nodes 54 and monitoring its execution over time. Scheduler 50 can execute on any one of worker nodes 54, or on a separate computing device. In various embodiments, broker 14 may execute in conjunction with, or integrated with, or distinct from, scheduler 50 in the same or different network element.

Assume, merely for illustrative purposes, and not as a limitation, that Regex_Bolt 20(1) may be more resource intensive than the other bolts, and could slow down the overall stream processing. Broker 14 may define a Regex_Bolt wrapper Shell_Bolt 20(4), for example, subclassing from Shell-Bolt to accelerate stream processing. Broker 14 may execute a shadow process (or a ShellBolt subclass) that can communicate via appropriate thrift interfaces between hardware accelerators 16(1)-16(N) among worker nodes 54 and bolts 20(1)-20(N). The ShellBolt extension may send data to a specific hardware accelerator, say 16(1), which can perform RegEx processing faster than RegEx_Bolt 20(1). Shell_Bolt 20(4) may get the results and communicate it back to distributed stream 17 using appropriate thrift interfaces.

Turning to FIG. 4, FIG. 4 is a simplified flow diagram illustrating example operations 100 that may be associated with an embodiment of communication system 10. Broker 14 may allocate resources for processing distributed streams 17(1)-17(M). At 102, broker 14 may receive capability information 40 from bolts 20(1)-20(N). At 104, broker 14 may receive capability information 40 from hardware accelerators

16(1)-16(N). At 106, broker 14 may map bolts 20(1)-20(N) to corresponding hardware accelerators 16(1)-16(N) based on capability information 40. Broker 14 may facilitate handshakes between bolts 20(1)-20(N) and corresponding hardware accelerators 16(1)-16(N). At 108, bolts 20(1)-20(N) and hardware accelerators 16(1)-16(N) may exchange handshake data 42 through broker 14. Handshake data 42 may comprise capability information 40 and processing information.

Appropriate network elements may route data to appropriate hardware accelerators 16(1)-16(N) in data path 24. At 110, input data 44 from one of spouts 18(1)-18(M) destined to a specific bolt (e.g., 20(1)) may be received in network 12 at a network element (e.g., switch). Input data 44 may be routed (e.g., forwarded, directed, switched, etc.) to mapped hardware accelerator (e.g., 16(1)) at 112. At 114, output data from the mapped hardware accelerator (e.g., 16(1)) may be received destined to another bolt (e.g., 20(2)).

Broker 14 may facilitate elastic workload allocation. At 116, broker 14 may monitor hardware accelerator workload in network 12. At 118, based on the workload, broker 14 may instruct one or more bolts 20(1)-20(N) to spawn itself, and may add one or more new hardware accelerators to the mapping. The operations may loop back to 102, at which capability information 40 may be received from the spawned bolt and new hardware accelerators, and the operations may continue thereafter. If the workload indicates that one or more hardware accelerators are being over-loaded, broker 14 may transfer a portion of the stream processing to another hardware accelerator at 120. The operations may loop back to 102, at which capability information 40 may be received from the different hardware accelerator and bolts, and the operations may continue thereafter. At 122, if the workload indicates that one or more hardware accelerators 16(1)-16(N) is not loaded, such hardware accelerators can be decommissioned (e.g., removed from data path 24, removed from network 12, as appropriate). The operations may loop back to 102, at which capability information 40 may be received from the revised list of hardware accelerators 16(1)-16(N) and bolts 20(1)-20(N).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, broker 14. In some embodiments, one or more of these features may be implemented in hardware, provided external to these elements, or consolidated in any appropriate manner to achieve the intended functionality. The various network elements (e.g., broker 14) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, broker 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 28) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 26) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
allocating a plurality of hardware accelerators to a corresponding plurality of bolts of a distributed stream in a network, wherein the distributed stream comprises a topology of at least one spout and the plurality of bolts;
facilitating a handshake between the hardware accelerators and the corresponding bolts, wherein the hardware accelerators execute respective processing logic on data elements of the distributed stream according to the corresponding bolts, wherein the hardware accelerators comprise dedicated processors that perform specialized computations faster than general purpose processors of the corresponding bolts, wherein facilitating the handshake comprises executing a shadow process to interface between the hardware accelerators and the corresponding bolts, wherein the shadow process extracts data from the distributed stream, communicates the extracted data to the hardware accelerators, and communicates results from the hardware accelerators to the corresponding bolts, facilitating transition to and from hardware of the hardware accelerators and software of the corresponding bolts; and
performing elastic allocation of the hardware accelerators and load balancing of stream processing in the network.

2. The method of claim 1, wherein allocating comprises:
receiving capability information from the bolts and the hardware accelerators; and
mapping the hardware accelerators to the bolts based on the capability information.

3. The method of claim 2, wherein the capability information from the bolts comprises respective locations in the distributed stream and identities of the bolts, wherein the capability information from the hardware accelerators comprises respective network locations and capabilities of the hardware accelerators.

4. The method of claim 1, wherein the handshake comprises an exchange of the capability information and processing information between the hardware accelerators and the corresponding bolts.

5. The method of claim 4, wherein the processing information comprises:
logic to extract input data from the distributed stream for processing, format input data, and format output data to the distributed stream after processing; and
destination of the output data in the network.

6. The method of claim 1, wherein performing elastic allocation of the hardware accelerators and load balancing of stream processing comprises:
monitoring hardware accelerator workload in the network; and
instructing at least one bolt to spawn itself and adding a new hardware accelerator based on the workload.

7. The method of claim 6, further comprising:
receiving capability information from the spawned bolt and the new hardware accelerator;
mapping the spawned bolt to the new hardware accelerator; and
facilitating the handshake between the spawned bolt and the new hardware accelerator.

8. The method of claim 6, wherein, if the workload indicates that one of the hardware accelerators is over-loaded, transferring at least a portion of stream processing to another one of the hardware accelerators.

9. The method of claim 6, wherein if the workload indicates that some of the hardware accelerators are not loaded, decommissioning the unloaded hardware accelerators and updating the mapping.

10. Non-transitory tangible media that includes instructions for execution, which when executed by a processor, is operable to perform operations comprising:
allocating a plurality of hardware accelerators to a corresponding plurality of bolts of a distributed stream in a network, wherein the distributed stream comprises a topology of at least one spout and the plurality of bolts;
facilitating a handshake between the hardware accelerators and the corresponding bolts, wherein the hardware accelerators execute respective processing logic on data elements of the distributed stream according to the corresponding bolts, wherein the hardware accelerators comprise dedicated processors that perform specialized computations faster than general purpose processors of the corresponding bolts, wherein facilitating the handshake comprises executing a shadow process to interface between the hardware accelerators and the corresponding bolts, wherein the shadow process extracts data from the distributed stream, communicates the extracted data to the hardware accelerators, and communicates results from the hardware accelerators to the corresponding bolts, facilitating transition to and from hardware of the hardware accelerators and software of the corresponding bolts; and performing elastic allocation of the hardware accelerators and load balancing of stream processing in the network.

11. The media of claim 10, wherein allocating comprises:
receiving capability information from the bolts and the hardware accelerators; and
mapping the hardware accelerators to the bolts based on the capability information.

12. The media of claim 10, wherein the handshake comprises an exchange of the capability information and processing information between the bolts and corresponding hardware accelerators.

13. The media of claim 10, wherein performing elastic allocation of the hardware accelerators and load balancing of stream processing comprises:
monitoring hardware accelerator workload in the network; and
instructing at least one bolt to spawn itself and adding a new hardware accelerator based on the workload.

14. An apparatus, comprising:
a broker executing in network environment comprising a memory element for storing data and a processor, wherein the processor executes instructions associated with the data, wherein the processor and the memory element cooperate, such that the apparatus is configured for:
allocating a plurality of hardware accelerators to a corresponding plurality of bolts of a distributed stream in a network, wherein the distributed stream comprises a topology of at least one spout and the plurality of bolts;
facilitating a handshake between the hardware accelerators and the corresponding bolts, wherein the hardware accelerators execute respective processing logic on data elements of the distributed stream according to the corresponding bolts, wherein the hardware accelerators comprise dedicated processors that perform specialized computations faster than general purpose processors of the corresponding bolts, wherein facilitating the handshake comprises executing a shadow process to interface between the hardware accelerators and the corresponding bolts, wherein the shadow process extracts data from the distributed stream, communicates the extracted data to the hardware accelerators, and communicates results from the hardware accelerators to the corresponding bolts, facilitating transition to and from hardware of the hardware accelerators and software of the corresponding bolts; and
performing elastic allocation of the hardware accelerators and load balancing of stream processing in the network.

15. The apparatus of claim 14, wherein allocating comprises:
receiving capability information from the bolts and the hardware accelerators; and
mapping the hardware accelerators to the bolts based on the capability information.

16. The apparatus of claim 14, wherein the handshake comprises an exchange of the capability information and processing information between the bolts and corresponding hardware accelerators.

17. The apparatus of claim 14, wherein performing elastic allocation of the hardware accelerators and load balancing of stream processing comprises:
monitoring hardware accelerator workload in the network; and
instructing at least one bolt to spawn itself and adding a new hardware accelerator based on the workload.

* * * * *